US010009590B2

(12) United States Patent
Boisson et al.

(10) Patent No.: US 10,009,590 B2
(45) Date of Patent: Jun. 26, 2018

(54) METHOD FOR REDUCING THE SIZE OF A STEREOSCOPIC IMAGE

(75) Inventors: Guillaume Boisson, Pleumeleuc (FR); Christel Chamaret, Chantepie (FR); Paul Kerbiriou, Thorigne-Fouillard (FR); Patrick Lopez, Livre sur Changeon (FR)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 881 days.

(21) Appl. No.: 14/127,274

(22) PCT Filed: Jun. 13, 2012

(86) PCT No.: PCT/EP2012/061206
§ 371 (c)(1),
(2), (4) Date: Mar. 22, 2014

(87) PCT Pub. No.: WO2012/175386
PCT Pub. Date: Dec. 27, 2012

(65) Prior Publication Data
US 2014/0204176 A1 Jul. 24, 2014

(30) Foreign Application Priority Data
Jun. 20, 2011 (FR) ..................................... 11 55400

(51) Int. Cl.
*H04N 13/00* (2018.01)
*G06K 9/00* (2006.01)
(Continued)

(52) U.S. Cl.
CPC ........... *H04N 13/0029* (2013.01); *G06T 3/40* (2013.01); *G09G 5/227* (2013.01);
(Continued)

(58) Field of Classification Search
CPC .. H04N 13/0055; H04N 13/0239; G06K 9/20; G09G 2340/0407; G06T 3/40
(Continued)

(56) References Cited

U.S. PATENT DOCUMENTS 7,388,583 B2 6/2008 Redert
8,896,672 B2 * 11/2014 Lee .................... H04N 13/0452
345/419

(Continued)

FOREIGN PATENT DOCUMENTS

WO WO2010040146 4/2010

OTHER PUBLICATIONS

Devernay, et al., "New View Synthesis for Stereo Cinema by Hybrid Disparity Remapping", Proceedings of 2010 IEEE 17th International Conference on Image Processing, Hong Kong, Sep. 2010, pp. 1-5.
Konrad, Janusz, " Enhancement of Viewer Comfort in Stereoscopic Viewing: Parallax Adjustment", INRS-Telecommunications, Institute National de la Recherche Scientifique, IS&T/SPIE Symposium on Electronic Imaging Steroscopic Displays and Virtual Reality Syst. Jan. 1999, pp. 1-12.

(Continued)

*Primary Examiner* — Thai Tran
*Assistant Examiner* — Syed Hasan
(74) *Attorney, Agent, or Firm* — Tutunjian & Bitetto, P.C.

(57) ABSTRACT

In an image processing method to display a stereoscopic image on a target screen, a disparity information (200) is associated with the stereoscopic image and is adapted for the display of the stereoscopic image on an original screen, the size of the original screen being different from the size of the target screen, the stereoscopic image comprising a first image (20) and a second image (21). In order to optimize the disparity of the stereoscopic image, the method comprises selecting a part of said first image according to at least one property associated with the first image; calculating a target disparity information associated with the selected part of the image according to the viewing conditions associated with the target screen and the original disparity information associated with the selected part of the first image.

20 Claims, 5 Drawing Sheets

(51) Int. Cl.
  *G09G 5/00* (2006.01)
  *G09G 5/22* (2006.01)
  *G06T 3/40* (2006.01)
  *H04N 21/81* (2011.01)
(52) U.S. Cl.
  CPC ..... *H04N 13/0022* (2013.01); *H04N 13/0051* (2013.01); *H04N 21/816* (2013.01)
(58) Field of Classification Search
  USPC ........................ 348/43, 42; 382/106; 345/660
  See application file for complete search history.

(56) References Cited

U.S. PATENT DOCUMENTS

| | | | |
|---|---|---|---|
| 2004/0189677 A1* | 9/2004 | Amann ................. | G06F 3/1454 345/660 |
| 2005/0190180 A1 | 9/2005 | Jin et al. | |
| 2009/0096863 A1* | 4/2009 | Kim ................... | G06K 9/00604 348/42 |
| 2010/0271461 A1* | 10/2010 | Takizuka ........... | H04N 13/0029 348/43 |

OTHER PUBLICATIONS

Kim Wook-Joong et al "Resizing of stereoscopic images for display adaptation", Proceedings of SPIE, vol. 7237, Jan. 1, 2009, pp. 72371S-72371S-8.

Manuel Lang et al "Nonlinear disparity mapping for stereoscopic 3D", ACm Transactions on Graphics, vol. 29, No. 4, Jul. 26, 2010.

Alex Mansfield et al "Scene Carving: Scene Consistent Image Retargeting", Sep. 5, 2010, Computer Vision A ECCV 2010, pp. 143-156.

Kei Utsugi et al "Seam carving for stereo images", 3DTV-Conf: The True Vision-Capture, Transmission and Display of #D Video, IEEE, Jun. 7, 2010, pp. 1-4.

N.S. Holliman: "Mapping perceived depth to regions of interest in stereoscopic images", Proceedings of SPIE, vol. 5291, No. 1, Jan. 19, 2004, pp. 117-128.

Chiao Wang et al: "Disparity manipulation for stereo images and video", Proceedings of SPIE, vol. 6803, Jan. 1, 2008, pp. 68031E-68031E-12.

Search Report dated Jul. 30, 2012.

* cited by examiner

METHOD FOR REDUCING THE SIZE OF A STEREOSCOPIC IMAGE

This application claims the benefit, under 35 U.S.C. § 365 of International Application PCT/EP2012/061206, filed Jun. 13, 2012, which was published in accordance with PCT Article 21(2) on Dec. 27, 2012 in English and which claims the benefit of French patent application No. 1155400 filed Jun. 20, 2011.

1. SCOPE OF THE INVENTION

The invention relates to the domain of image or video processing and more particularly in the processing of images and/or video in 3 dimensions (3D) The invention also relates to the domain of "retargeting" (or again "reframing") of one or more three dimensional video images (3D).

2. PRIOR ART

According to the prior art, there are several methods used in video processing to restore a perception of relief, for example by stereoscopy. In stereoscopy, two views (respectively right and left) of a same scene (also called right image and left image or even first image and second image) are recorded, with two different video cameras or two different cameras, from two different viewpoints shifted laterally with respect to each other. These two views of the same scene are displayed on a display device (for example a PDP (Plasma Display Panel) type, or LCD (Liquid Crystal Display) type or by means of a video projector) either in a sequential manner temporally (left image then right image and so on) or in a spatially interleaved manner (line (or column) of the left image then line (respectively column) of the right image and so on) to restore the perception of relief, that is depth information. The amplitude of a 3D effect or the perception of a relief in a 3D image depends directly on the disparity of the left and right images, that is the distance (measurable in number of pixels for example) separating two pixels, that is one pixel for the left image and one pixel for the right image, representing the same video information at the level of the display device, that is representing the same element of the recorded scene. The disparity of the left and right images of a film or video is decided by the producer and depends on the distance between the left and right cameras filming the scene. This disparity is advantageously adapted to determined viewing conditions of the 3D content by the user, that is that disparity is adapted to the display devices on which the 3D content will be viewed, this display device being called original display device in the rest of the description. According to the original display device on which it is planned to display the 3D video content, the producer decides on the importance of the level of disparity between the right and left images forming a stereoscopic image. The viewing conditions are related to the display device and correspond to the width of the display screen and to the distance at which a spectator watches the 3D content displayed.

Moreover, it is known how to adapt the size of the video images planned to the original on an original display device so that the content of these images is adapted to be viewed on a display device having a size that is different from the one of the display device of the original, for example a smaller size.

With the appearance of new display devices capable of displaying 3D video content for which the size range is extremely broad (going for example from the screen size of a cinema theatre to the size of a mobile phone screen), it also becomes necessary to adapt the disparity between the left and right images of a 3D content and the size of the images that are initially planned for the size of an original display device so that the amplitude of the 3D effects is adapted to a display device having a different size from the one of the original display device, the viewing conditions changing from one display device to another.

3. SUMMARY OF THE INVENTION

The purpose of the invention is to overcome at least one of these disadvantages of the prior art.

More particularly, the invention has the notable purpose of optimising the size and disparity associated with a stereoscopic image for display on a target screen different from the screen on which the stereoscopic image is intended to be displayed.

The invention relates to a image processing method to display a stereoscopic image on a target screen, a disparity information being associated with said stereoscopic image and being adapted for the display of the stereoscopic image on an original screen, the size of the original screen being different from the size of the target screen, the format of the original screen being different from the format of the target screen, the stereoscopic image comprising a first image and a second image. The method comprises the following steps for:

selecting a part of the first image according to at least one property associated with the first image and the size and the format of the target screen, calculating a disparity budget associated with the target screen according to viewing conditions associated with the target screen, calculating a target disparity information associated with the selected part of the image according to the disparity budget and an original disparity information associated with the selected part of the first image.

Advantageously, the calculation of the disparity budget associated with the target screen depends on the original disparity information associated with the selected part of the first image.

According to a particular characteristic, the lower limit of the disparity budget is equal to the opposite of the product of a value representative of an interocular distance for viewing a content displayed on the target screen by the spectator and a value representative of an admissible threshold of the vergence accommodation conflict and in that the upper limit of the disparity budget is the smallest value between the absolute value of the lower limit and the value representative of the interocular distance of the spectator.

Advantageously, the value representative of the interocular distance of the spectator corresponds to the product of the number of pixels per line of the target screen and the interocular distance of the spectator expressed in meters divided by the width of the target screen.

Advantageously, the target disparity information further depends on minimum and maximum original disparity values associated with the selected part of the first image.

According to another characteristic, the target disparity information is calculated by using a linear function having the original disparity information for a variable.

According to a specific characteristic, the linear function has for slope the minimum value between on the one hand a value representing the product of the difference between the upper limit and the lower limit of the disparity budget by the inverse of the difference between the maximum original disparity value and the minimum original disparity value and on the other hand a predetermined threshold value.

Advantageously, the linear function has for slope the minimum value between on the one hand a value representing the product of the difference between the upper limit and the lower limit of the disparity budget by the inverse of the difference between the maximum disparity value of the first image with respect to the second image and the minimum disparity value of the first image with respect to the second image and on the other hand a predetermined threshold value.

According to another characteristic, the lower limit of the disparity budget further depends on the minimum disparity value of the first image in relation to the second image and the upper limit of the disparity budget further depends on the maximum disparity value of the first image in relation to the second image.

According to a particular characteristic, the lower limit of the disparity budget further depends on the minimum disparity value of the selected part of the first image and the upper limit of the disparity budget further depends on the maximum disparity value of the selected part of the first.

According to a specific characteristic, the viewing conditions associated with the target screen comprise the viewing distance of the target screen and the width of the target screen.

Advantageously, the size of the original screen is greater than the size of the target screen.

4. LIST OF FIGURES

The invention will be better understood, and other specific features and advantages will emerge upon reading the following description, the description making reference to the annexed drawings wherein.

5. DETAILED DESCRIPTION OF EMBODIMENTS OF THE INVENTION

Figure 1:
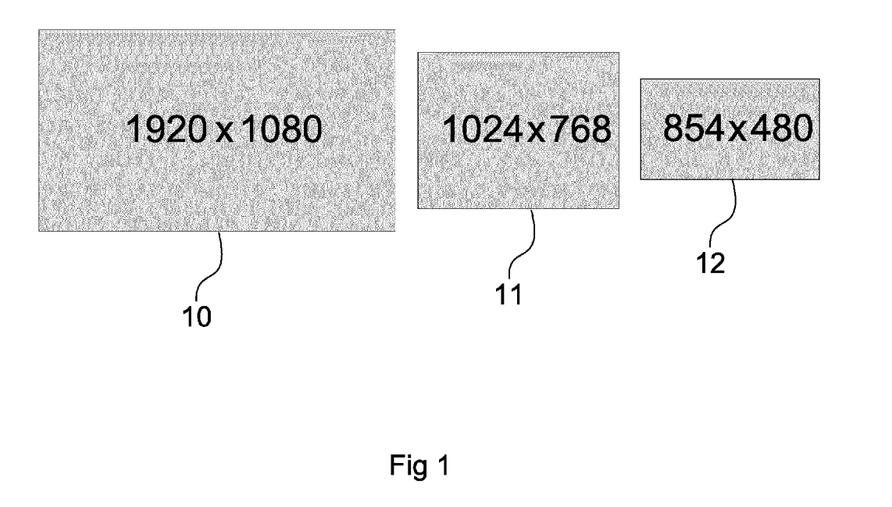
FIG. 1 illustrates an original display device and two target display devices according to a particular embodiment of the invention, FIG. 2 diagrammatically illustrates the structure of a processing unit of a stereoscopic image for display on a target display device of FIG. 1, according to a particular embodiment of the invention.

FIG. 1 illustrates an original display device 10 (or original screen 10) and two examples of target display devices 11 and 12 (or target screens 11 and 12). It is understood by original display device a display device whose characteristics were taken into account during the production of a 3D content, that is that the 3D content (and more particularly the associated disparity information) is particularly adapted for being viewed on the original display device 10. it is understood by target display device a display device having a different size from the one of the original display device and on which the 3D content will finally be viewed. As a non-restrictive example, the original display device is a 46 inch television screen in 16/9 format with a resolution of 1920×1080 (that is 1080 lines of 1920 pixels each) and a width of 1 meter. The viewing distance associated with such a screen 10 is 3 meters, which corresponds to the distance at which a spectator is recommended to watch a 3D or 2D content. The viewing angle associated with such a screen 10 is 19°. As a non-restrictive example, the first target display device 11 is a screen, for example a screen of a tablet adapted to the display of 3D content, of 10 inches in 4/3 format with a resolution of 1024×768 (that is 768 lines of 1024 pixels each) and a width of 20 cm. The viewing distance associated with the screen 11 is 50 cm and the associated viewing angle is 23°. As a non-restrictive example, the second target display device 12 is a screen, for example a screen of a telephone adapted to display 3D content, of 3.4 inches in 16/9 format with a resolution of 854×480 (that is 480 lines of 854 pixels each) and a width of 7.5 cm. The viewing distance associated with the screen 12 is 30 cm and the associated viewing angle is 14°. The viewing conditions, that is the width of the screen and the viewing distance, of a 3D content are different from one display device to another, the display distance being globally all the smaller as the width of the screen is smaller Moreover, the format of the original display device 10 (that is 16/9) being different from the format of the first target display device 11 (that is 4/3), simply scaling the images provided to be viewed on the original display device 10 is not enough for these images to be viewed without difficulty (for example, without excessive visual fatigue) on the first original display device 11.

Figure 2:
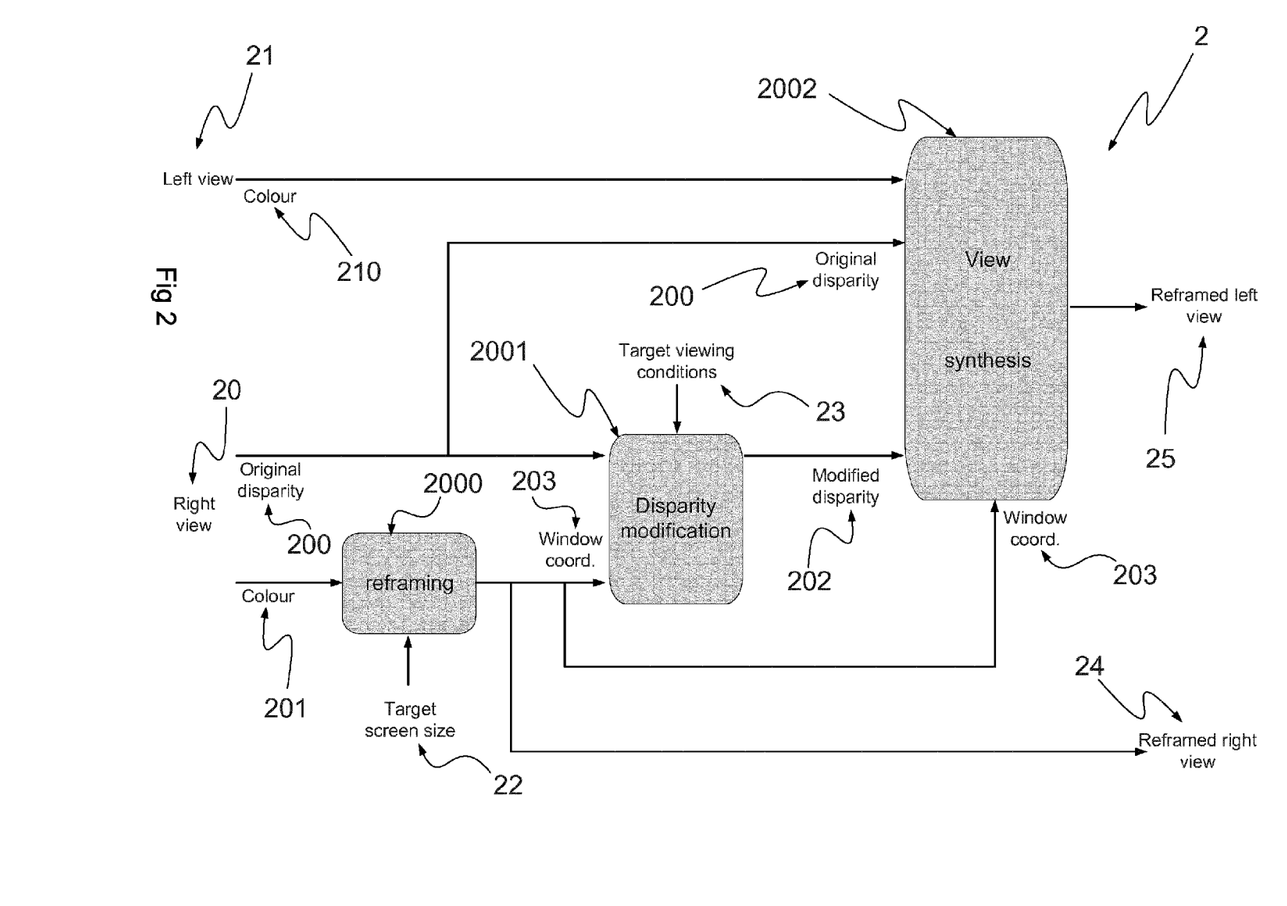

FIG. 2 diagrammatically shows a material embodiment of a image processing unit 2, according to a particular non-restrictive embodiment of the invention, The processing unit (or the processing module) 2 takes for example the form of a programmable logical circuit of type FPGA (Field-Programmable Gate Array) for example, ASIC (Application-Specific Integrated Circuit) or a DSP (Digital Signal Processor).

The processing unit 2 comprises the following elements:
a reframing unit 2000,
a disparity modification unit 2001,
a view synthesis unit 2002,
data buses connecting the different elements of the processing unit between each other and with the exterior of the processing unit 2.

A first signal 20 representative of the first original image (or right view) and a second signal 21 representing the second original image (or left view) are supplied at the input of the processing unit 2. The first original image and the second original form an original stereoscopic image. The first signal 20 advantageously comprises two information channels, the first information channel 200 being representative of the original disparity (between the pixels of the first image and the corresponding pixels of the second image) and the second information channel 201 being representative of the colour associated with each pixel of the first image, the colours corresponding for example to a level of grey or a level of grey for each of the RGB colours (Red, Green, Blue). The second signal 21 advantageously comprised an information channel 210 representative of the colour associated with each pixel of the second image, the colour corresponding for example to a level of grey or to a level of grey for each of the RGB colours (Red, Green, Blue).

The colour information 201 of the first image is supplied to the reframing unit 2000 via an appropriate data bus. An information representative of the size of the target screen 22 is also supplied at the input of the reframing unit 2000. From the colour information 201 of the first image and from the information representative of the target screen 22, the reframing unit selects a part of the first image suitable to be displayed on the target screen. The size of the window corresponding to the selected part of the first image corresponds advantageously to the size of the target screen. By referring to the examples of the figure, if the target screen corresponds to the first target screen 11 of resolution 1024× 768, the size of the selected window will be 1024×768 pixels. If the target screen corresponds to the second target screen 12 of resolution 854×480, the size of the selected window will be 854×480 pixels. The window of the first image is advantageously selected according to a saliency map comprising a saliency value associated with each pixel of the first image, the saliency map used to determine what part or parts of the first image are the most attractive to the human eye (for example a part of the image comprising text or the face of a character or a part of the image where the light contrasts are greater then in the rest of the first image). It is found at the output of the reframing unit 2000 an information 203 representative of the coordinates of the selected window of the first image corresponding to the reframed right view 24. This information 203 representative of the coordinates of the selected window is sent to the disparity modification unit 2001. The information 203 representative of the coordinates of the selected window advantageously comprises the coordinates of the left upper pixel of the window and the coordinates of the lower right pixel of the window expressed in the frame of the first image (the coordinates of a pixel correspond advantageously to the line number and column number in the first image). According to a variant, the information 203 comprises the line/column coordinates of the upper left pixel with the number of lines and the number of columns of the selected window. The reframed right view 24 at the output of the processing unit 2 comprises the colour information associated with each of the pixels of the window selected in the first image. The size of the reframed view 24 is perfectly adapted for the display on the target screen and the video content of the reframed right view comprises the centre or centres of interest of the video content of the first image.

The original disparity information 200 of the first image is sent to the disparity modification unit 2001 via an appropriate data bus. This original disparity information 200 of the first image is sent to the disparity modification unit in parallel to the information 203 representative of the coordinates of the selected window. An information 23 representative of the viewing conditions associated with the target screen (that is for example the size of the screen, the number of pixels per line of the target screen and the viewing distance) is also supplied at the input of the disparity modification unit 2001. From the information 203 representative of the coordinates of the selected window and of the original disparity information 200, the disparity modification unit 2001 estimates the values of the original disparity associated with each pixel of the selected window. The disparity modification unit 2001 estimates a disparity budget associated with the target screen from the information 23 representative of the viewing conditions. The disparity budget corresponds to an acceptable disparity interval by a spectator watching a 3D content on the target screen. The disparity budget is advantageously defined by the limit values of the acceptable disparity interval, that is at the lower acceptable disparity limit value $d_{min}^{target}$ and at the upper $d_{max}^{target}$ acceptable disparity limit value. The upper and lower limit values are calculated from the following equations:

$$\begin{cases} d_{min}^{target} = -d_{\infty}^{target} \times \xi \cdot D \\ d_{max}^{target} = \min\{d_{\infty}^{target} \times \xi \cdot D; d_{\infty}^{target}\} \end{cases} \text{ where } d_{\infty}^{target} = \frac{N}{W} \times t_e \quad \text{Equations 1, 2}$$

Where N corresponds to the number of pixels per line of the target screen,

W corresponds to the width of the target screen in meters,

D corresponds to the viewing distance of a content displayed on the target screen (for example D=0.5 m for the first target screen 11 and D=0.3 m for the second target screen 12), $t_e$ corresponds to the interocular distance of the spectator (typically 6.5 cm for an adult and 4 cm for a child), $\xi$ corresponds to the upper admissible threshold of the accommodation vergence conflict, expressed in dioptres (for example $\xi=0.2\delta$), $d_{\infty}^{target}$ corresponds to the interocular distance expressed in pixels.

By taking as example the screens of the display devices 10, 11 and 12 of FIG. 1, by using $\xi=0.2\delta$ and $t_e=4$ cm the following is obtained:

for the first target display device 11:
  $d_{\infty}^{target}$=205 pixels
  $d_{min}^{target}$=−20.5 pixels
  $d_{max}^{target}$=20.5 pixels for the second target display device 12:
  $d_{\infty}^{target}$=455 pixels
  $d_{min}^{target}$=−27 pixels
  $d_{max}^{target}$=27 pixels for the original target display device 10:
  $d_{\infty}^{original}$=77 pixels
  $d_{min}^{original}$=−46 pixels
  $d_{max}^{original}$=46 pixels Advantageously, $t_e$ is set by default as being equal to the smallest value, that is at the interocular distance of a child, which can provide a viewing comfort acceptable to the greatest number of spectators. According to a variant, the value of $t_e$ is adjustable and can be changed by the spectator according to their own interocular distance. According to another variant, the value of $t_e$ can be chosen from among a finite number of values, for example two values corresponding respectively to the average interocular distance of adults and to the average interocular distance of children.

The disparity modification unit 2001 calculates a target disparity information 202, also called modified disparity, from the disparity budget of the target screen and from the original disparity information of the selected window. This disparity information 202 is sent to the view synthesis unit 2002. Examples of calculation methods of the target disparity information are described hereafter in more detail with regard to the parts of the description corresponding to the FIGS. 3 and 4.

The colour information 210 of the second image is supplied to the view synthesis unit 2002 via an appropriate data bus. The colour information 210 is received by the unit 2002 in parallel to the original disparity 200, modified disparity information coming from the first image (the first and second image being representative of the same scene and acquired simultaneously) and information 203 representative of the coordinates of the selected window coming from the reframing unit 2000. From the original disparity information 200, the information 203 representative of the coordinates of the selected window of the right view and the colour information 210 of the left view, the view synthesis unit selects and window in the second image (left view) that comprises the pixels of the left view corresponding to the pixels of the selected window of the right view. The original disparity information 200 supplying the difference in number of pixels on a line between a pixel of the right view and the corresponding pixel of the left view, finding the window of the left view corresponding to the selected window of the right view is a basic action of the view synthesis unit 2002. The window thus selected from the left view by the unit 2002 has the same size as the selected window of the right view by the reframing unit 2000. Then from the modified disparity information 202 obtained by taking into account the disparity budget of the target screen, the view synthesis unit 2002 determines a reframed left view 25, that is a window of the left view comprising the pixels of the left view (that is the colour information associated with these pixels) corresponding to the pixels of the selected window of the right view of which the disparity between each pixel of the window of the right view corresponding to the window of the left view corresponds to the modified disparity value estimated by the disparity modification unit 2001. There is thus a good correspondence of colour information between a pixel of the window of the right view and the corresponding pixel of the left view but with a disparity between these pixels adapted to the target screen.

The display of the reframed right view 24 and the corresponding reframed left view 25 on the target screen (that is in a temporally sequential manner (right view reframed then left view reframed) or in a spatially interleaved manner (at the level of the right and left view lines) offers the user a 3D content whose amplitude of 3D effects is perfectly adapted to the viewing conditions associated with the target screen.

Figure 3:
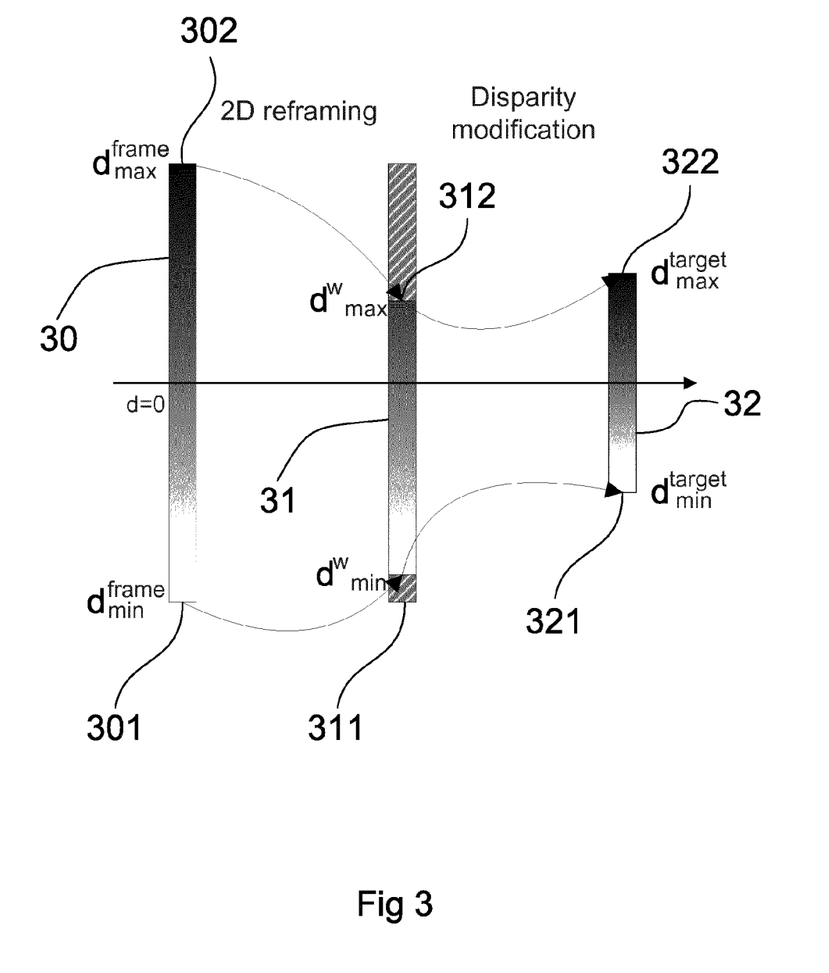
FIGS. 3 and 4 illustrate a method for adapting the disparity information according to a target display device of FIG. 1, according to two particular embodiments of the invention.

FIG. 3 illustrates a first method for estimating the target disparity information (assigned to the pixels of the first reframed image by the processing unit 2 with respect to the pixels of the second reframed image) depending on a target screen 11 or 12, advantageously implemented in the processing unit 2 and more specifically in the disparity modification unit 2001, according to a first non-restrictive particular embodiment of the invention. FIG. 3 illustrates the disparity intervals 30, 31, 32 observed in respectively the first original image, the window selected from the first image and at the level of the reframed image displayed on the target screen. Hence, $d_{max}^{frame}$ 302 corresponds to the maximum disparity level observed in the first original image with respect to the second original image (for example the straight view 20 with respect to the left view 21) and $d_{min}^{frame}$ 301 corresponds to the minimum disparity level observed in the first original image with respect to the second original image. The disparity interval 30 delimited by the maximum $d_{max}^{frame}$ 302 and minimum $d_{max}^{frame}$ 301 values represents the interval in which is located all the disparity values associated with the pixels of the first original image (in relation to the second original image). The disparity values observed in the window selected in the first image (by the reframing unit 2000 for example) are a subset of the disparity values observed in the first original image and are represented by the interval 31 delimited by a maximum disparity limit $d_{max}^{w}$ 312 corresponding to the upper disparity value observed in the window selected and by a minimum disparity limit $d_{min}^{w}$ 311 corresponding to the lower disparity value observed in the selected window. Finally, the last disparity interval 32 illustrated in FIG. 3 represents the disparity values that can be associated with the pixels of the images reframed by the processing unit 2 for display on the target screen. This interval 32 is delimited by the upper $d_{min}^{cible}$ 322 and lower $d_{min}^{cible}$ 321 limits of the disparity budget of the target screen. The target disparity values associated with the pixels of the reframed left and right views of a reframed stereoscopic image for display on the target screen are advantageously determined by using a linear function having for variable the original disparity values d associated with the original stereoscopic image (that is the disparity values associated with the pixels of the right view 20 in relation to the left view 21 and comprised in the original disparity information 200). A target disparity value d' comprised in the interval 32 is calculated via the following equation:

$$d' = d_{min}^{target} + \frac{d_{max}^{target} - d_{min}^{target}}{d_{max}^{w} - d_{min}^{w}} \times (d - d_{min}^{w}) \quad \text{Equation 3}$$

This linear relationship advantageously corresponds to a linear view interpolation combined with a determined disparity shift. All the target disparity values calculated by using the equation 3 are comprised in the target disparity budget of the target screen.

According to a variant, the slope of the linear relationship corresponds to the minimum value between on the one hand a value representing the product of the difference between the upper limit and the lower limit of the disparity budget by the inverse of the difference between the maximum original disparity value and the minimum original disparity value of the window and on the other hand a predetermined threshold value. According to this variant, the target disparity value d' is calculated via the following equation:

$$d' = d_{min}^{target} + \min\left\{\frac{d_{max}^{target} - d_{min}^{target}}{d_{max}^{w} - d_{min}^{w}}; K\right\} \times (d - d_{min}^{w}) \quad \text{Equation 4}$$

Where K corresponds to the predetermined threshold value, K being for example equal to 1, 1.5 or 2.

This variant has the advantage of removing all risk of view extrapolation that may occur when the values of $d_{min}^{w}$ 311 and $d_{max}^{w}$ 312 are too close, which can occur owing to the reframing operation carried out on the first view to obtain the selection of the reframed window. Indeed, the view extrapolation has the risk of generating undesirable artefacts during the view synthesis. In order to prevent any risk of a view synthesis artefact, K is advantageously chosen equal to 1.

Figure 4:
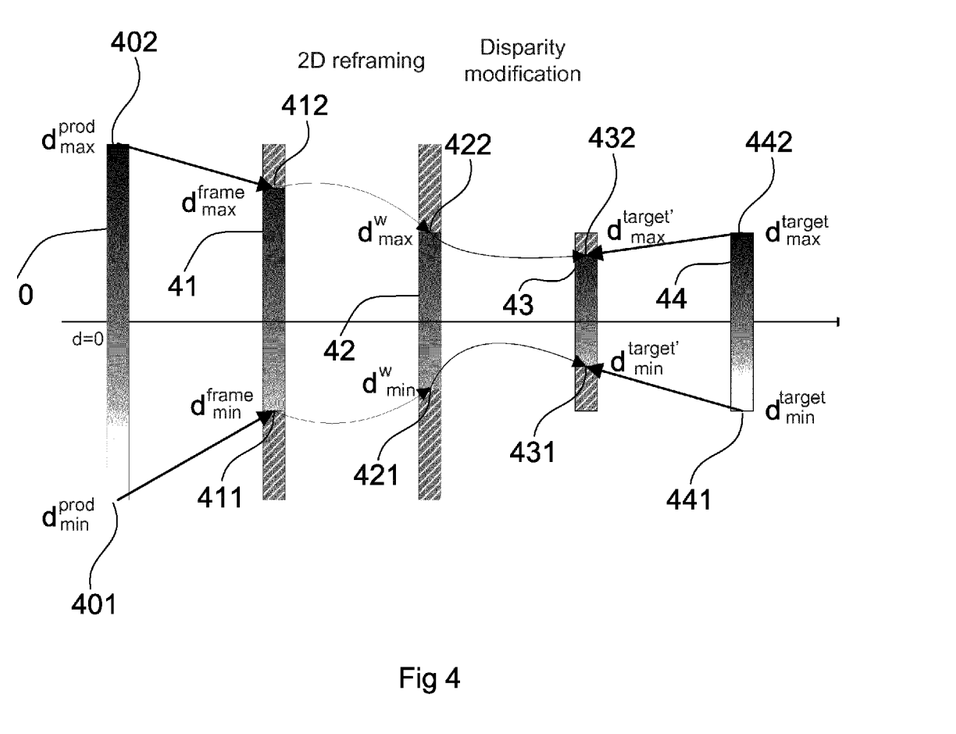

FIG. 4 illustrates a second method for estimating the target disparity information depending on a target screen 11 or 12, advantageously implemented in the processing unit 2 and more specifically in the disparity modification unit 2001, according to a first non-restrictive particular embodiment of the invention. FIG. 4 illustrates different disparity intervals 40, 41, 42, 43, 44. The disparity interval 40 corresponds advantageously to the disparity interval available for the first target of production whereas the disparity interval 41 corresponds to the interval really used by the producer and corresponds to the disparity interval that is found in the original image. The disparity interval 42 corresponds to the interval of values observed at the level of the window selected in the first image and corresponds to a subset of the interval 41. As for the disparity interval 43, it corresponds to the target value interval by taking into account the constraints imposed by the producer on the disparity values and the disparity value 44 corresponds to the interval of values available for the reframed image on the target screen without taking into account the constraints imposed by the producer. $d_{max}^{prod}$ 402 corresponds to the original disparity upper value set for the production of the original stereoscopic image and $d_{min}^{prod}$ 401 corresponds to the original disparity lower value set for the production of the original stereoscopic image. $d_{max}^{frame}$ 412 corresponds to the disparity upper value in the original image by taking into account the constraints imposed by the producer during the final realisation of the original stereoscopic image and $d_{min}^{frame}$ 411 corresponds to the lower disparity value in the original image by taking into account the constraints imposed by the producer during the final realisation of the original stereoscopic image. $d_{max}^{w}$ 422 corresponds to the upper disparity value observed in the selected window and $d_{min}^{w}$ 421 corresponds minimum limit value of disparity corresponding to the lower disparity value of observed in the selected window. $d_{max}^{target'}$ 432 and $d_{min}^{target'}$ 431 correspond respectively to the upper limit disparity value and lower limit disparity value in the reframed image by taking into account the constraints imposed by the producer which restrict the disparity amplitude available in relation to the target values for the target screen calculated on the basis of the first production values (that is interval 40). The target disparity budget constrained (represented by an upper limit value $d_{max}^{target'}$ and a lower limit value $d_{min}^{target'}$) by the producer choices for the upper and lower original disparity limits is calculated by using the following equations:

$$d_{min}^{target'} = d_{min}^{target} \times \frac{d_{min}^{frame}}{d_{min}^{prod}} \qquad \text{Equation 5}$$

$$d_{max}^{target'} = d_{max}^{target} \times \frac{d_{max}^{frame}}{d_{max}^{prod}} \qquad \text{Equation 6}$$

A target disparity value constrained by the choices of the producer d' comprised in the interval 43 is calculated via the following equation:

$$d' = d_{min}^{target'} + \frac{d_{max}^{target'} - d_{min}^{target'}}{d_{max}^{w} - d_{min}^{w}} \times (d - d_{min}^{w}) \qquad \text{Equation 7}$$

According to a variant, a new constraint is placed on the constrained target disparity budget by taking account of the upper $d_{max}^{w}$ 422 and lower $d_{min}^{w}$ 421 limit values of the selected window. By taking into account these new constraints, a new constrained target disparity budget is obtained, represented by its upper $d_{max}^{target''}$ and lower $d_{min}^{target''}$ limit values obtained by the following equations:

$$d_{min}^{target''} = d_{min}^{target} \times \frac{d_{min}^{w}}{d_{min}^{prod}} \qquad \text{Equation 8}$$

$$d_{max}^{target''} = d_{max}^{target} \times \frac{d_{max}^{w}}{d_{max}^{prod}} \qquad \text{Equation 9}$$

A target disparity value newly constrained by the limit disparity values of the selected window d" is calculated via the following equation:

$$d'' = d_{min}^{target''} + \frac{d_{max}^{target''} - d_{min}^{target''}}{d_{max}^{w} - d_{min}^{w}} \times (d - d_{min}^{w}) \qquad \text{Equation 10}$$

According to another variant, the target disparity value d' (respectively d') is calculated by taking into account the upper $d_{max}^{frame}$ lower $d_{min}^{frame}$ limit disparity values of the original stereoscopic image by the following equation:

$$d' = d_{min}^{target} + \frac{d_{max}^{target} - d_{min}^{target}}{d_{max}^{frame} - d_{min}^{frame}} \times (d - d_{min}^{w}) \qquad \text{Equation 11}$$

According to yet another variant, the target disparity value d' (respectively d') is calculated by taking into account the upper $d_{max}^{prod}$ and lower $d_{min}^{prod}$ limit disparity values of first production by the following equation:

$$d' = d_{min}^{target} + \frac{d_{max}^{target} - d_{min}^{target}}{d_{max}^{prod} - d_{min}^{prod}} \times (d - d_{min}^{w}) \qquad \text{Equation 12}$$

Figure 5:
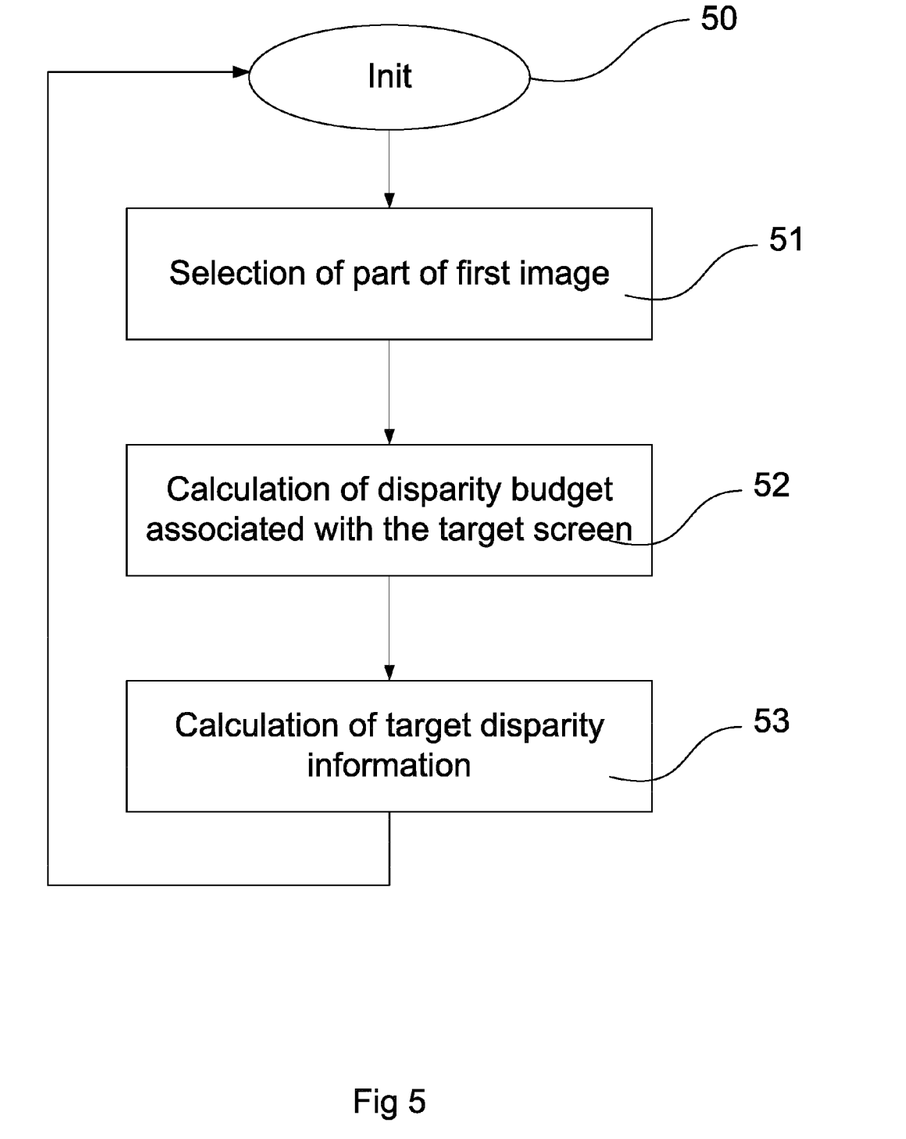
FIG. 5 illustrates a image processing method to display a stereoscopic image on a target display device of FIG. 1, according to a particular embodiment of the invention.

FIG. 5 illustrates a image processing method for displaying a stereoscopic image on a target screen 11 or 12 implemented in a processing unit 2, according to a particular non-restrictive embodiment of the invention.

During an initialisation step 50, the different parameters of the processing unit are updated.

Next, during a step 51, a part of a first image of an original stereoscopic image formed by two original images, that is a first original image and a second original image, is selected. An original disparity information is associated with the original stereoscopic image. The original disparity information is for example associated with the first original image, a disparity value being associated with each pixel of the first original image and representing the shift in x (that is on a line) in pixel or pixels between a pixel of the first original image and the pixel corresponding to the second original image. It is understood by corresponding pixels of the first original image and of the second original image two pixels having noticeably the same colour levels and representing a same element of a scene, the first original image and the second original image being two different viewpoints taken at a same time t. The original stereoscopic image and more particularly the associated original disparity information is particularly suitable for the display of the original stereoscopic image on an original screen having a first size, that is that the amplitude of the 3D effects associated with the stereoscopic image is adapted so that the 3D effects are seen without difficulty by a spectator. This means that the interval of the disparity values associates with the original stereoscopic image (represented by its upper and lower limit values) is determined (for example by the producer of the original stereoscopic image) according for example to the size of the original screen on which the stereoscopic image is intended to be displayed and to the viewing distance of the stereoscopic image on the original screen (corresponding to an average distance in meters between the spectator and the original screen). The selected part of the first image (also called selected window) is selected according to the size of a target screen, different from the original screen, on which the stereoscopic image will finally be displayed. The size of the screen is different from the original screen (for example its width or height or the two dimensions is/are different). Advantageously, the size of the target screen is less than the size of the original screen. The selected part of the first image is selected according to the format of the target screen, different from the format of the original screen. The format of the target screen is different from the format of the original screen (for example, the target screen has a format of type 4/3 or 16/9 and the target screen respectively has a format of type 16/9 or 16/10). The selected part of the first image is advantageously selected according to one or more properties associates with the first image, as for example the levels of contrast associated with the pixels of the first image or the colour levels associated with the pixels of the first image or the type of content associated with the first image (for example, text or a image of a face). The property or properties of the first image are for example represented in the form of a saliency map associated with the first image. Then, during a step 52, the disparity budget associated with the target screen is calculated. The disparity budget corresponds to a level of amplitude of 3D effects that a spectator can watch on the target screen without being uncomfortable, without feeling any unusual tiredness. The disparity budget corresponds to a disparity value interval that can be assigned to the pixels of the stereoscopic image on the target screen, called reframed stereoscopic image. The disparity budget is characterized by an upper limit disparity value and by a lower limit disparity value. These two limit values depend on the viewing conditions associated with the target screen, that is for example the width of the target screen, the viewing distance associated with the target screen, that is the distance at which a spectator views the reframed stereoscopic image on the target screen and the number of pixels per line of the target screen. The disparity budget is advantageously calculated from equations 1 and 2 described previously. The lower limit of the disparity budget is equal to the opposite of the product of a value representative of an interocular distance for viewing a content displayed on the target screen by the spectator and a value representative of an admissible threshold of the vergence accommodation conflict and the upper limit of the disparity budget is the smallest value between the absolute value of the lower limit and the representative value of the interocular distance of the spectator. The representative value of the interocular distance of the spectator corresponds to the product of the number of pixels per line of the target screen and the interocular distance of the spectator expressed in meters divided by the width of the target screen.

According to a variant, the disparity budget is determined from a table of correspondence comprising a list of target screens, a disparity budget being assigned to each target screen and having been determined by the use of equations 1 and 2 or empirically for example.

According to another variant, the lower limit of the disparity budget depends on the minimum disparity value of the original stereoscopic image (that is the minimum disparity value of the first original image with respect to the second original image) and the upper limit of the disparity budget depends on the maximum disparity value of the original stereoscopic image (that is the minimum disparity value of the first original image with respect to the second original image).

According to an additional variant, the lower limit of the disparity budget depends on the minimum disparity value of the selected part of the first image in relation to the selected part of the second image and in that in that the upper limit of the disparity budget depends on the maximum disparity value of the selected part of the first image.

Finally, during a step 53, an information representative of the target disparity associated with the reframed stereoscopic image to display on the target screen is calculated according to the target disparity budget previously estimated and according to an original disparity information associated with the selected part of the original stereoscopic image (that is associated with the selected part of the first original image). The target disparity information further depends advantageously on minimum and maximum original disparity values associated with the selected part of the first image. The target disparity information is advantageously calculated by using a linear function having for variable the original disparity information, for example by means of one of the equations 3, 4, 7, 10, 11 or 12 described previously. The linear function has for example for slope a value representing the product of the difference between the upper limit and the lower limit of the disparity budget by the inverse of the difference between the maximum original disparity value and the minimum original disparity value.

According to a variant, the linear function has for slope the minimum value between on the one hand a value representing the product of the difference between the upper limit and the lower limit of the disparity budget by the inverse of the difference between the maximum original disparity value and the minimum original disparity value and on the other hand a predetermined threshold value.

According to a variant, the linear function has for slope the minimum value between on the one hand a value representing the product of the difference between the upper limit and the lower limit of the disparity budget by the inverse of the difference between the maximum disparity value of the first image with respect to the second image and the minimum disparity value of the first image with respect to the second image and on the other hand a predetermined threshold value.

Naturally, the invention is not limited to the embodiments previously described.

In particular, the invention is not restricted to a method for processing images but extends to the processing unit implementing such a method and to the display device comprising a processing unit implementing the image processing method.

Advantageously, the format of the signal representative of the original stereoscopic image supplied at the input of the processing unit is of the MVD2 (Multi-view Video Depth with 2 images) type. According to this format, the original stereoscopic image comprises two images corresponding to a different viewpoint, to each view being associated a disparity information representative of the disparity between the view in question and the other view.

According to a variant, an unprocessed original stereoscopic image is supplied at the input of the processing unit 2, that is a stereoscopic image formed by two images each corresponding to a different viewpoint, without the disparity information being supplied explicitly in an associated shell. According to this variant, the disparity information is deduced from the two views forming the original stereoscopic image by using any disparity estimation method known by those skilled in the art.

According to another variant, the disparity information supplied at the input of the processing unit 2 is of the card type of depth used in the MPEG 3DV standard that comprises disparity values stored in 8 bits:

$$\bar{d} = 255 \times \frac{\frac{1}{z} - \frac{1}{z_{far}}}{\frac{1}{z_{near}} - \frac{1}{z_{far}}} = 255 \times \frac{d_{max}^{frame} - d}{d_{max}^{frame} - d_{min}^{frame}} \quad \text{(équation 13)}$$

La disparité en pixels est donnée par:

$$d = f \cdot b \times \left(\frac{1}{z_{conv}} - \frac{1}{z}\right) \quad \text{Equation 14}$$

Where f is the focal length (in pixels) of the camera having been used to enter the stereoscopic image, b is the inter-camera baseline (in meters) and $z_{conv}$ is the depth (en meters) of the convergence plane (that is the zero disparity plane)

According to the available metadata, the disparity (in pixels) is found from a card of depth via the following equation:

$$d = d_{max}^{frame} - \frac{\bar{d}}{255} \times (d_{max}^{frame} - d_{min}^{frame}) \quad \text{Equation 15}$$

That is:

$$d = f \cdot b \times \left[\left(\frac{1}{z_{conv}} - \frac{1}{z}\right) + \frac{\bar{d}}{255}\left(\frac{1}{z_{far}} - \frac{1}{z_{near}}\right)\right] \quad \text{Equation 16}$$

where z is the depth of an object with respect to the camera, $z_{near}$ is the reducing value of depth, that is the minimum depth that can be achieved in the image, $z_{far}$ is the increasing value of depth, that is the maximum depth that can be achieved in the image.

The invention claimed is:

1. A method of processing a stereoscopic image to be displayed on a target screen, wherein a disparity information is associated with said stereoscopic image and is adapted for the display of the stereoscopic image on an original screen, a size of the original screen being different from a size of the target screen, a format of the original screen being different from a format of the target screen, the stereoscopic image comprising a first image and a second image, the method comprising:

selecting a part of said first image according to at least one property associated with the first image and according to the size and the format of the target screen, calculating a disparity budget associated with the target screen according to the original disparity information associated with the selected part of the first image, a lower limit of said disparity budget being equal to the opposite of the product of a value representative of an interocular distance, of a value representative of a viewing distance of a content displayed on the target screen and of a value representative of an admissible value of the vergence accommodation conflict, and an upper limit of said disparity budget being equal to the smallest value between the absolute value of said lower limit and the value representative of the interocular distance, calculating a target disparity information associated with the selected part of the first image according to said disparity budget and original disparity information associated with the selected part of the first image, and displaying said selected part of the first image and corresponding part of said second image according to said target disparity information.

2. The method according to claim 1, wherein the value representative of the interocular distance corresponds to the product of the number of pixels per line of the target screen and the interocular distance expressed in meters divided by the width of the target screen.

3. The method according to claim 1, wherein the target disparity information further depends on minimum and maximum original disparity values associated with the selected part of the first image.

4. The method according to claim 3, wherein the target disparity information is calculated by using a linear function having the original disparity information for variable.

5. The method according to claim 4, wherein a slope of the linear function is a minimum value between a first value and a second value, said first value representing the product of the different between the upper limit and the lower limit of the disparity budget by the inverse of the difference between the maximum original disparity value and the minimum original disparity value.

6. The method according to claim 4, wherein a slope of the linear function is a minimum value between a first value and a second value, said first value representing the product of the difference between the upper limit and the lower limit of the disparity budget by the inverse of the difference between the maximum disparity value of the first image with respect to the second image and the minimum disparity value of the first image with respect to the second image.

7. The method according to claim 1, wherein the lower limit of the disparity budget further depends on the minimum disparity value of the first image in relation to the second image and in that the upper limit of the disparity budget further depends on the maximum disparity value of the first image in relation to the second image.

8. The method according to claim 1, wherein the lower limit of the disparity budget further depends on the minimum disparity value of the selected part of the first image and in that the upper limit of the disparity budget further depends on the maximum disparity value of the first image in relation to the selected part of the second image.

9. The method according to claim 1, wherein the viewing conditions associated with the target screen comprise the viewing distance of the target screen and the width of the target screen.

10. The method according to claim 1, wherein the size of the original screen is greater than the size of the target screen.

11. An apparatus configured for processing a stereoscopic image to be displayed on a target screen, wherein a disparity information is associated with said stereoscopic image and is adapted for the display of the stereoscopic image on an original screen, a size of the original screen being different from a size of the target screen, a format of the original screen being different from a format of the target screen, the stereoscopic image comprising a first image and a second image, wherein the apparatus comprises at least one processor configured to:

select a part of said first image according to at least one property associated with the first image and according to the size and the format of the target screen, calculate a disparity budget associated with the target screen according to the original disparity information associated with the selected part of the first image, a lower limit of said disparity budget being equal to the opposite of the product of a value representative of an interocular distance, of a value representative of a viewing distance of a content displayed on the target screen and of a value representative of an admissible value of the vergence accommodation conflict, and an upper limit of said disparity budget being equal to the smallest value between the absolute value of said lower limit and the value representative of the interocular distance, calculate a target disparity information associated with the selected part of the first image according to said disparity budget and an original disparity information associated with the selected part of the first image, and display said selected part of the first image and corresponding part of said second image according to said target disparity information.

12. The apparatus according to claim 11, wherein the value representative of the interocular distance corresponds to the product of the number of pixels per line of the target screen and the interocular distance expressed in meters divided by the width of the target screen.

13. The apparatus according to claim 11, wherein the target disparity information further depends on minimum and maximum original disparity values associated with the selected part of the first image.

14. The apparatus according to claim 13, wherein the target disparity information is calculated by using a linear function having the original disparity information for variable.

15. The apparatus according to claim 14, wherein a slope of the linear function is a minimum value between a first value and a second value, said first value representing the product of the difference between the upper limit and the lower limit of the disparity budget by the inverse of the difference between the maximum original disparity value and the minimum original disparity value.

16. The apparatus according to claim 14, wherein a slope of the linear function is a minimum value between a first value and a second value, said first value representing the product of the difference between the upper limit and the lower limit of the disparity budget by the inverse of the difference between the maximum disparity value of the first image with respect to the second image and the minimum disparity value of the first image with respect to the second image.

17. The apparatus according to claim 11, wherein the lower limit of the disparity budget further depends on the minimum disparity value of the first image in relation to the second image and in that the upper limit of the disparity budget further depends on the maximum disparity value of the first image in relation to the second image.

18. The apparatus according to claim 11, wherein the lower limit of the disparity budget further depends on the minimum disparity value of the selected part of the first image and in that the upper limit of the disparity budget further depends on the maximum disparity value of the first image in relation to the selected part of the second image.

19. The apparatus according to claim 11, wherein the viewing conditions associated with the target screen comprise the viewing distance of the target screen and the width of the target screen.

20. The apparatus according to claim 11, wherein the size of the original screen is greater than the size of the target screen.

* * * * *